United States Patent [19]

Tsai

[11] Patent Number: 4,797,729
[45] Date of Patent: Jan. 10, 1989

[54] SYSTEM INCORPORATING AN ERROR TOLERANT PICTURE COMPRESSION ALGORITHM

[75] Inventor: Yusheng T. Tsai, Rochester, N.Y.

[73] Assignee: Eastman Kodak Company, Rochester, N.Y.

[21] Appl. No.: 152,793

[22] Filed: Feb. 5, 1988

[51] Int. Cl.⁴ .................. H04N 7/13; H04N 11/04
[52] U.S. Cl. .................... 358/13; 358/133; 358/138
[58] Field of Search ............ 358/133, 138, 135, 13

[56] References Cited

U.S. PATENT DOCUMENTS

| | | | |
|---|---|---|---|
| 3,403,226 | 9/1968 | Wintringham | 358/135 |
| 4,205,341 | 5/1980 | Mitsuya | 358/135 |
| 4,319,267 | 3/1982 | Mitsuya | 358/75 |
| 4,672,427 | 6/1987 | Rzeszewski | 358/13 |
| 4,716,453 | 12/1987 | Pawelski | 358/13 |
| 4,740,832 | 4/1988 | Sprague | 358/13 |

*Primary Examiner*—Howard W. Britton
*Attorney, Agent, or Firm*—Edward Dugas

[57] ABSTRACT

The system and method of the present invention compresses digitized color image signals in real time with an error tolerant compression algorithm utilizing block truncation coding. The system operates upon the digitized color components Y, I and Q derived from scanning an image plane. Memory buffers, under control of an address generator, receive digitized color components and store them in a 4×4 block format. The system further subdivides each Y and I block into four 2×2 blocks. An $I_{avg}$ signal is derived by averaging 4 neighboring pixels in each 2×2 block of the I image plane, and a $Q_{avg}$ signal is derived by averaging the 16 pixel values forming the 4×4 block of the Q image plane. Signal compression is accomplished by representing the Y and I blocks with two values and a bitmap. Three pipelined signal channels work in parallel to real-time process the signals. The processed signals are encoded for transmission over a channel. At the channels receiver a decoder decodes the signals and a decompression circuit reconstructs the Y, I and Q signals.

10 Claims, 7 Drawing Sheets

Y—SIGNAL

I—SIGNAL

Q—SIGNAL

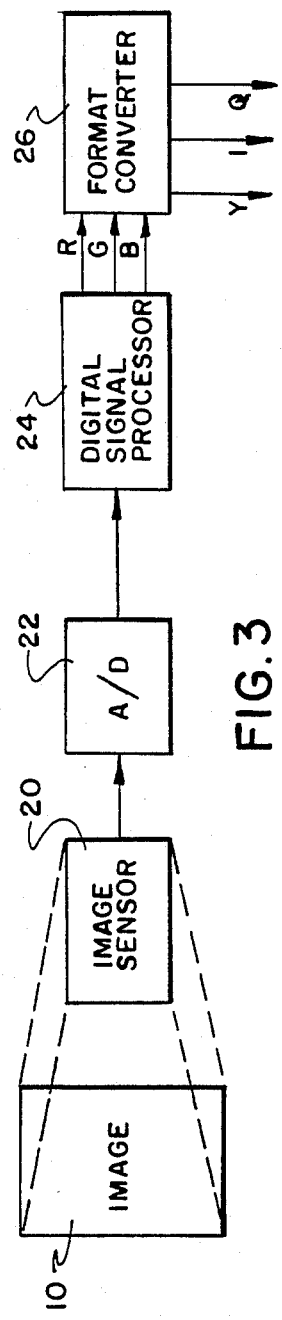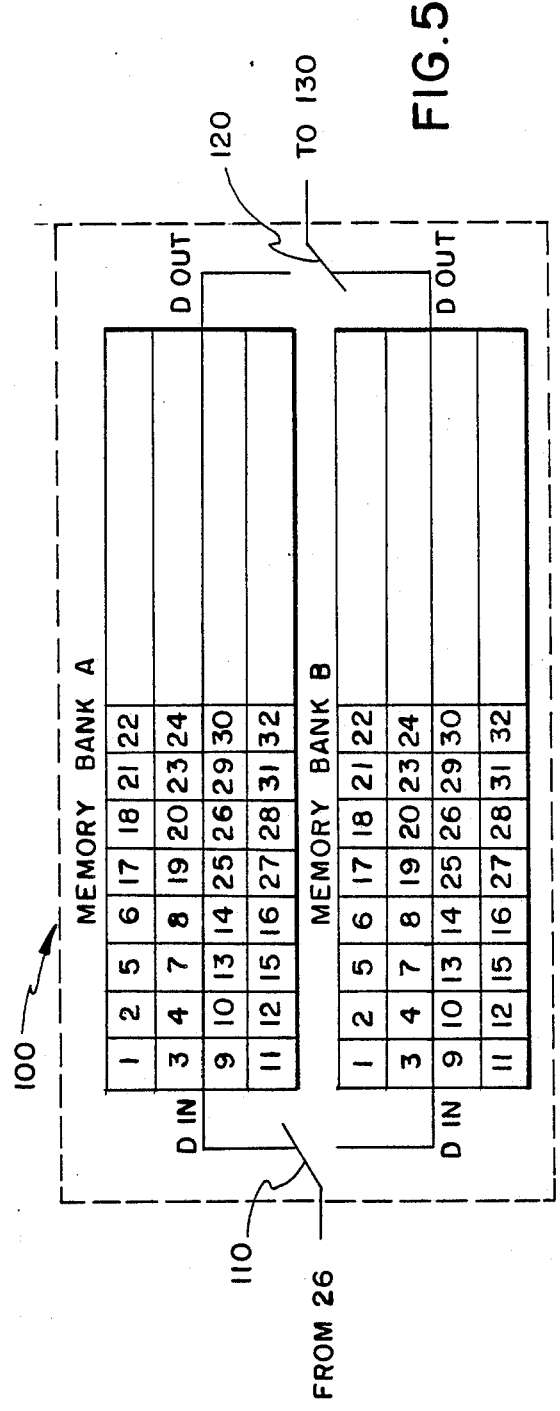

SYSTEM INCORPORATING AN ERROR TOLERANT PICTURE COMPRESSION ALGORITHM

BACKGROUND OF THE INVENTION

The present invention relates to a system and a method for compressing digitized color image signals utilizing an error tolerant compression algorithm.

Image compression is used to reduce the amount of data needed to replicate the image with little or no reduction in quality at a later time. The requirement for reducing the data is driven by the need for quickly transmitting the image and by the demand to reduce the amount of storage space needed to store each image.

During the process of recording or transmitting a color image, compressed digital signal errors may be generated. A commercially viable system must be able to tolerate these errors so as to perform its compression and decompression functions without degrading the quality of the reconstructed image.

Prior art systems generally operate by separating a color image into its red, green and blue components or by converting these components into three color components denoted Y, I and Q. Each of these color components are then individually processed. One technique of processing these color components that is particularly relevant to the present invention is called "block truncation coding." An image is block coded by dividing an image frame into blocks and performing some operation, upon the picture elements in each block. Block coding was first applied to monochrome images, see, for example, representative U.S. Pat. Nos. 3,403,226 and 4,205,341 and a publication by E. J. Delp and O. R. Mitchell entitled "Image Compression Using Block Truncation Coding," IEEE Transactions on Communications, Vol. COM-27, No. 9, pp. 1335-1342, September 1979. Block coding was then applied to color images, see, for example, U.S. Pat. No. 4,319,267 entitled "Picture Coding and/or Decoding Equipment," by E. Mitsuya et al.

In the U.S. Pat. No. 4,319,267, the color image is separated into three color planes of image color components Y, I and Q representing the encoding of blocks of pixels.

The encoding provides each block with a gray level code that represents one typical gray level component of the pixels in the block and a resolution code. The patent also teaches the use of different block sizes for encoding the color components. The example given in the patent divides the Y color components representing an image frame into small blocks with the I and the Q color components being divided into larger blocks. The stated advantage of different block sizes for different color planes is enhancement of the coding efficiency without substantial reduction in the quality of a reconstructed image. In the example of the patent, the resolution code, obtained for the Y color plane, is equally employed in the coding of the I and the Q color planes. The stated advantage for this approach is that the amount of coded data needed for reconstruction is reduced as compared with the amount of coded data needed for the case where the resolution code of each color plane has to be transmitted or recorded.

If the speed of image transmission or recording is of prime importance, then the amount of signal compression has to be maximized with a resultant degradation in the quality of the reconstructed image. Also, with high speed transmission or recording, errors may be generated which can accumulate through each image frame causing further degradation of the reconstructed image.

The present invention is directed to an optimum compromise between the requirement for high speed color image compression and high tolerance to channel errors.

SUMMARY OF THE INVENTION

The present invention is a system and a method for compressing digitized color image signals in real time which system utilizes an error tolerant compression algorithm.

The system of the present invention operates upon three provided digitized image planes Y, I and Q of a scanned image; it can also be in other color spaces.

The system utilizes memory buffers to place the scanned image color components into a block format.

The system then divides these three image planes into 4×4 blocks, simultaneously, within each Y block and I block, the image plane is subdivided into four 2×2 blocks. An $I_{avg}$ signal is derived by averaging the 4 neighboring pixels in each 2×2 block of the I image plane and a $Q_{avg}$ signal is derived by averaging all 16 pixel signal values in the 4×4 block of the Q image plane.

The signals, Y and $I_{avg}$, are then block truncated by forming a bitmap for each signal and by generating a two level signal for each signal component of the corresponding block.

The four sets of Y and one set of I two level signals are then each quantized and represented by a 7 bit value. The $Q_{avg}$ signal is also quantized and represented by a 6 bit value.

The block truncated signals may then be transmitted or recorded, by suitable coding and decoding apparatus, over a communication channel or through a magnetic head.

At the receiving end of the communication channel or at the playback of a recording, a decompression apparatus reverses the compression procedure to provide a sequence of Y, I and Q signals which replicate the scanned original image. Any single channel error is restricted into a very small block of the picture and this feature of error-tolerance is important in applications where pictures are recorded.

Accordingly, it is a primary object of the present invention to provide an improved error tolerant color image compression system.

It is a further object of the present invention to provide a system for implementing an algorithm for compressing digital color image signals.

It is yet another object of the present invention to provide a system and an algorithm for enabling real time compression of digital color image signals.

These and other objects of the present invention will become more apparent where taken in conjunction with the following description and drawings where like characters indicate like parts and which drawings from a part of the present application.

BRIEF DESCRIPTION OF THE DRAWINGS

FIG. 3 is a block diagram of a system encoder which may be used with the present invention.

FIG. 5 is a block diagram of an input buffer which may be used with the system of FIG. 4.

DESCRIPTION OF THE PREFERRED EMBODIMENT

Figures 1, 2A, 2B, 2C:
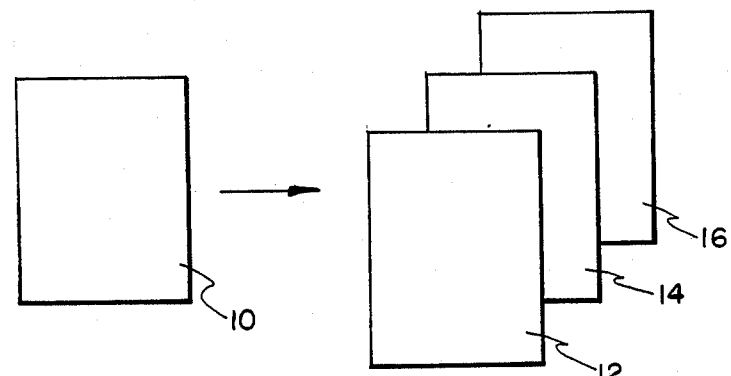
FIG. 1 illustrates the separation of a color image into three color component images.
FIGS. 2A, 2B and 2C illustrate the blocking performed on each of the color component images.

Referring to FIG. 1, a color image 10 is separated into three color planes (spaces) 12, 14 and 16 of image color components Y, I and Q, respectively. These components correspond to those designated by The National Television System Committee (NTSC) as the Y, I and Q color signal components. These components are derived from a simultaneous, red (R), green (G) and blue (B) line scan of a color image, or other sources.

The signal Y is denoted as the image luminance and is generally defined as:

$$Y = 0.299R + 0.587G + 0.114B.$$

The signals I and Q each represent a chrominance and are associated with the image luminance signal Y. The I and Q signals are linear functions of primary color signals such that:

$$I = 0.6R - 0.28G - 0.32B$$

$$Q = 0.2R - 0.52G + 0.31B.$$

Referring to FIGS. 2A-2C, the compression algorithm operates upon the Y and I signals, representing color planes 12 and 14, respectively, by grouping the Y signals into four 2×2 blocks and the I signals into one 2×2 block with each element formed from the average of 4 neighboring pixels, as shown in FIG. 2B.

The Q color signal is derived by averaging all of the pixels within the 4×4 block of FIG. 2C.

As will be described, compression is achieved by using two values and a bitmap to represent the pixels values for both the Y and I blocks and an average value for the Q block.

A system for generating the Y, I and Q color plane (space) signals from the image 10 is illustrated in FIG. 3. The system incorporates an image sensor 20, which may be a CCD array, for generating analog signals as a function of the image impinging on the image sensor. The analog signals from the image sensor 20 are sequenced out and digitized by an analog-to-digital (A/D) converter 22. A digital signal processor 24 receives the digitized signals from the A/D converter and performs various functions such as edge enhancement, Gamma correction and color interpolation on the signals and outputs processed digitized red, green and blue signals, R, G, and B, to a format converter 26. The format converter converts these signals to the Y, I and Q signals according to the previously defined relationships. The signals are in a serial 8 bit format when they leave the format converter.

The system thus far described is of a type well known in the art for converting a color image into parallel strings of Y, I and Q digital signals.

Figure 4:
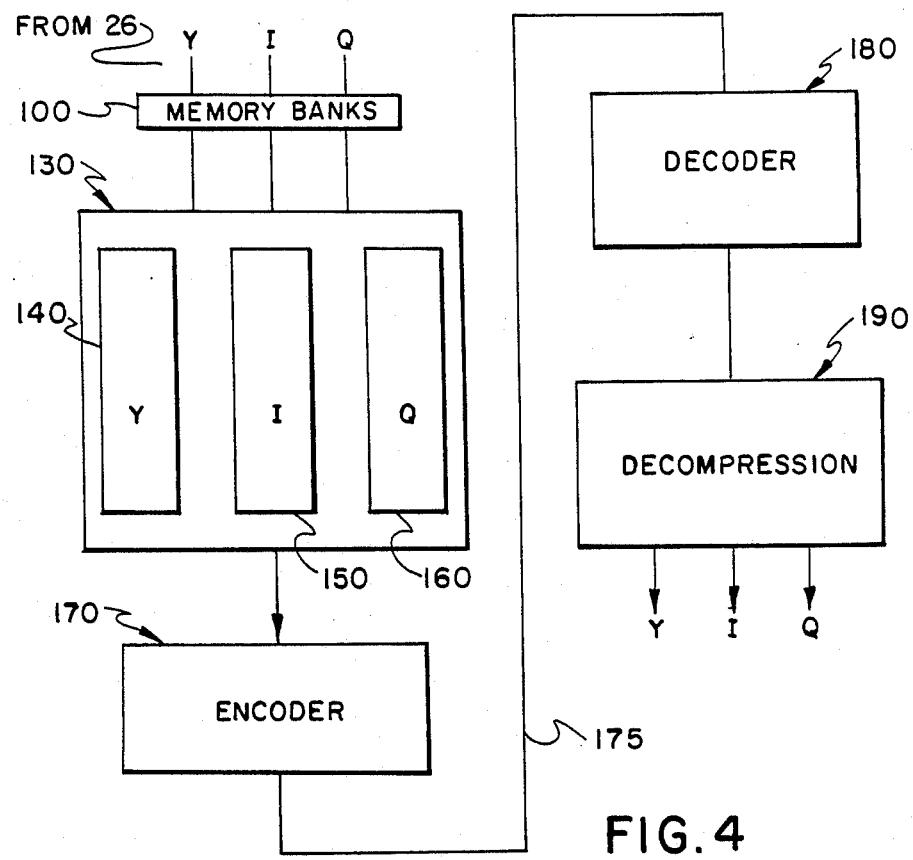
FIG. 4 is a block diagram of the system of the present invention coupled to a communication channel or recording head.

Referring now to FIG. 4 wherein a block diagram of the remainder of the system is illustrated, the serial 8 bit signals, Y, I and Q, from the format converter 26 are directed to an input buffer 100 for temporary storage in a block format. The input buffer is shown in detail in FIG. 5, comprised of memory banks A and B. Each memory bank is capable of storing four lines of scanned image data and is at least 24 bits deep at each memory location to accommodate the 8 bit each, Y, I and Q signals.

A switch 110, which is 24 contacts deep, toggles between the inputs to memory bank A and memory bank B as a function of a system clock signal. In a complementary manner, a switch 120 toggles between the outputs of memory bank B and memory bank A.

The numbers depicted in the boxes of the memory banks correspond to the pixel positions in a line scan of the image 10. For example, the first pixel scanned is denoted "1" and its associated digitized signals Y, I and Q which are equivalent to 24 bits are stored in the 24 memory cells of the memory bank A. In a like manner, the second pixel, the pixel denoted as "2" is stored in the next adjacent memory cell. This block-forming process continues until 16 pixels that have been represented by 24 parallel streams of digital bits representing the Y, I and Q signals are stored as a block in memory bank A. When the input image data stream making up the first four lines of scanned data have been stored in memory bank A in block format, the switch 110 is toggled to the input of the memory bank B and the process of blocking the serial bit streams is repeated for the next four lines of scanned data. While the memory bank B is being filed with the next four lines of serial bits, memory bank A is read out by means of switch 120, which is now toggled to the output of memory bank A. The switch 120 is 24 connections deep for reading out the 24 bits which make up the Y, I and Q signals. To address the bits into the memory locations in the block order shown, a particular sequence of memory addresses has to be generated.

Figure 6:
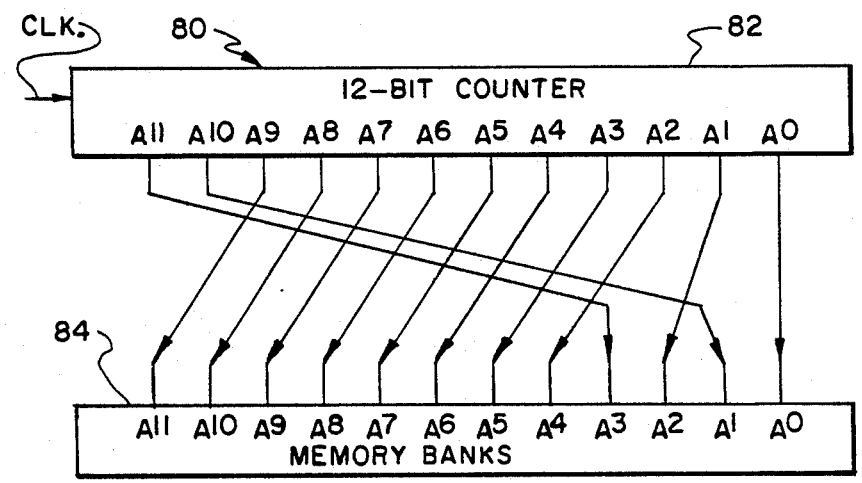
FIG. 6 is a block diagram of an address generator which is used with the input buffer of FIG. 5.

Referring now to FIG. 6, an address generator 80 is shown comprised of a 12 bit counter 82 coupled to the address inputs $A_0$–$A_{11}$ of the address portion 84 of the A and the B memory banks.

In order to generate the addresses in the desired sequence two counters are used, a horizontal counter and a line counter. The size of the horizontal counter is dependent on the number of pixels in the horizontal direction of the image sensor. The line counter, in the preferred embodiment of the invention, is a 2 bit ripple counter capable of a four count which corresponds to the number of scan lines that can be buffered by a memory bank.

The 12 bit counter 82 functions as the two counters in that it counts clock pulses in the normal manner and provides a binary output, indicative of the current count, on its outputs labeled $A_0$–$A_{11}$. By hardwiring the outputs of counter 82 to the memory bank's address inputs $A_0$-$A_{11}$, as shown, the desired sequence is obtained.

Referring back to FIG. 5 in conjunction with FIG. 6, note that the addresses change their least significant bits, which is equivalent to bit 0 of the counter, with every subsequent pixel. That is, when comparing the scan sequence numerical position with the pixels position in the block format, the positions are related by the least significant address bit change. Two concatenated subsequent pixels cover a distance of 4, which is equivalent to bit 2 of the counter, and two subsequent 4 pixels in a line have a distance of 16, which is equivalent to bit 4 of the counter. In a like manner, the difference between the first two lines and the second two lines within a buffer is 8, which is equivalent to bit 3 of the counter, and the difference between two subsequent lines is 2, which is equivalent to bit 1 of the counter. As previously stated, for the embodiment shown the line counter and the horizontal counter are concatenated together to form a single counter.

Referring back to FIG. 4 the blocked Y, I and Q signals, from the input buffer 100, are directed to an image compressor 130 which is comprised of three parallel signal processing paths 140, 150, and 160, for the Y, I and Q signals, respectively. The description of the operation of these signal paths will correspond to the description of the apparatus shown in FIGS. 7, 8 and 9.

The signals from the image compressor 140 are directed to an encoder 170 if it is desired to transmit the signals over a channel 175. The type of encoder chosen will be dependent upon the type of channel that is selected. In a like manner, at the receiving end of the channel 175 is a decoder 180 for decoding the encoded signals. The makeup and operation of the encoder 170, decoder 180 and channel 175, is well known by persons skilled in the art and further discussion of these element will not be undertaken.

A decompression circuit 190 receives the signals from the decoder 180 and provides at its output the reconstructed Y, I and Q signals. The operation and make-up of the decompression circuit 190 will be described in conjunction with FIG. 11.

The steps for processing the Y signal appearing at the input of the processing path 140 are as follows:

Step 1: Compute the average as a threshold value $$Y_{avg.\ 11} = \tfrac{1}{4}(Y_{11}+Y_{12}+Y_{21}+Y_{22})$$

$Y_{avg.\ 12}$, $Y_{avg.\ 21}$ and $Y_{avg.\ 22}$ will be obtained by similar equations, but by pipelined execution, i.e., when stage 2 is executed, $Y_{avg.\ 12}$ is also being computed and etc.

Step 2. Generate a bitmap for the Y signal if $Y_{ij} \geq Y_{avg.} \rightarrow$ bitmap$-Y_{ij}=1$ otherwise$\rightarrow$bitmap$-Y_{ij}=0$.

Step 3: Generate two levels for each subblock
$Y_{Hi}$=Average of $Y_{ij}$ with bitmap=1.
$Y_{Lo}$=Average of $Y_{ij}$ with bitmap=0.

Step 4: Quantize the Y values into 7 bits each. The number of bits/4×4 block for Y=72 bits.

The whole process is a three-stage pipeline. Every stage has 5 clock cycles. The second stage consists of Step 2 of 3.

The steps for processing the I signal appearing at the input of the process path 150 are as follows:
Step 1: Compute the average of each subblock $$I_{avg.\ 11} = \tfrac{1}{4}(I_{11}+I_{12}+I_{21}+I_{22})$$

repeated for $I_{avg.\ 12}$, $I_{avg.\ 21}$ and $I_{avg.\ 22}$.

Step 2: Generate the average of four $I_{avg.\ ij}$ for ij=1, 2.

$$I_{avg.\ all} = \tfrac{1}{4}(I_{avg.\ 11}+I_{avg.\ 12}+I_{avg.\ 21}+I_{avg.\ 22})$$

Step 3: Generate a bitmap for the I signal if $I_{avg.\ ij} \geq I_{avg.\ all} \rightarrow$Bitmap$-I_{ij}=1$ otherwise$\rightarrow$Bitmap$-I_{ij}=0$.

Step 4: Generate two levels for the whole block $I_{Hi}$=Average of $I_{avg.\ ij}$ with Bitmap=1 $I_{Lo}$=Average of $I_{avg.\ ij}$ with Bitmap=0

Step 5: Quantize the I values into 7 bits each.
The number of bits/4×4 block for I=18 bits.

The steps for processing the Q signal appearing at the input of the processing path 160 are as follows:
Step 1: Compute the average of the block $$Q_{avg.} = \frac{1}{16} \sum_{\substack{i=1 \\ j=1}}^{4} Q_{ij}$$

Step 2: Quantize the Q values into 6 bits.

Figure 7:
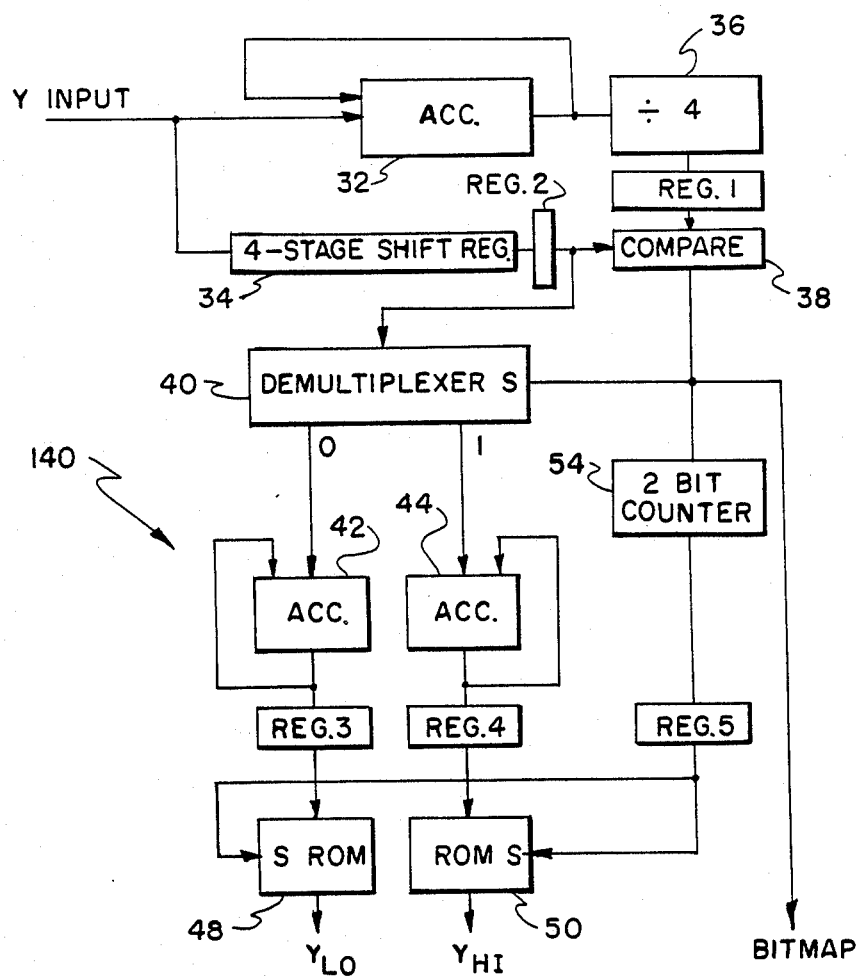
FIG. 7 is a block diagram of the Y-channel architecture shown in the system embodiment of FIG. 4.

Referring now to FIG. 7, wherein the pipelined architecture 140 for the Y channel is illustrated, the Y input data is directed to an accumulator 32 and to a 4-stage shift register 34. The accumulator 32 sums the first 4 pixels of a 2×2 block of Y signals. In the preferred embodiment of the invention the accumulator 32 is 10 bits wide. The output from the accumulator 32 is directed to a divide by 4 circuit 36. A register REG.1 receives the summed and divided $Y_{avg.}$ signal, which has been generated in four clock cycles and provides the summed $Y_{avg.}$ signal at its output to a compare circuit 38 on the fifth clock cycle. These 4 pixel values of the 2×2 block have also been entering into the 4-stage shift register 34, one each clock cycle. That is, the output of shift register 34 is a binary value that was received four clock periods prior. The output bit signal from the shift register 34 is directed to a REG.2 which on the occurrence of the fifth clock pulse provides the received signal to an input of the comparator 38. The comparing circuit 38 receives as one input the $Y_{avg.}$ signal from REG.1 and the Y input signal from REG.2 and generates a single bit result of "1" if the value of the signal in REG.2 is larger than or equal to the threshold value of the signal in REG.1. For all other cases, the output of the comparing circuit 38 is a "0." The REG.1 maintains the threshold value for a period corresponding to four clock cycles in order to provide a comparison for all four input signals. The output for the comparing circuit 38 is equivalent to the bitmap for the Y signal which was recited in Step 2 previously discussed in the specification. The output bits from REG.2 are also directed to an input of a demultiplexer 40. The 1:2 demultiplexer 40 is controlled by the bitmap signal received from the output of the comparing circuit 38 at the input S. When the output of the comparing circuit 38 is a "0" bit the demultiplexer 40 connects the output of REG.2 to one input of an accumulator 42 and when the output of the comparing circuit 38 is a "1" bit the output of the REG.2 is connected to one input of an accumulator 44. Accumulators 42 and 44 are 10 bit accumulators which are used to sum the Y signals corresponding to those that are below the average threshold value and those that are above or are equal to the average threshold value, respectively. The summed output signals are directed to a register REG.3 and to a register REG.4. These registers are in turn connected individually to the input of a ROM 48 and a ROM 50.

A 2 bit counter 54 is used to count the number of pixels whose values are larger than or equal to the threshold value, that is, the number of pixels having a bitmap equal to 1, coming from the comparing circuit 38. The accumulators 42 and 44 accumulate sums for 4 clock cycles and are then reset. Each of the ROMs 48 and 50 are used to do the division and quantization for the different sums in parallel. The division is done by reading data out of a look-up table and the quantization is a truncation of the least significant bit. Other truncation methods are possible and can be combined with division into a look-up table. That operation will be described in detail with the discussion of FIG. 10. The output bits from the counter 54 are directed to a register REG.5, and from there are directed to the enabling inputs S of the ROMs 48 and 50 so as to enable the ROMs at the end of a summation by the accumulators 42 and 44. The 2 bits from the counter 54 can take on four possible states which states select the function that the ROMs are to operate under. The outputs of the ROMs are the signals $Y_{Lo}$ and $Y_{Hi}$.

The structural arrangement thus far described provides a real-time operation for the processing of the Y input signal. While the summation process is being undertaken in the circuitry below the comparing circuit 38, the circuitry above the comparing circuit 38 begins to compute the threshold value $Y_{avg.}$ for the next 2×2 block.

Figure 8:
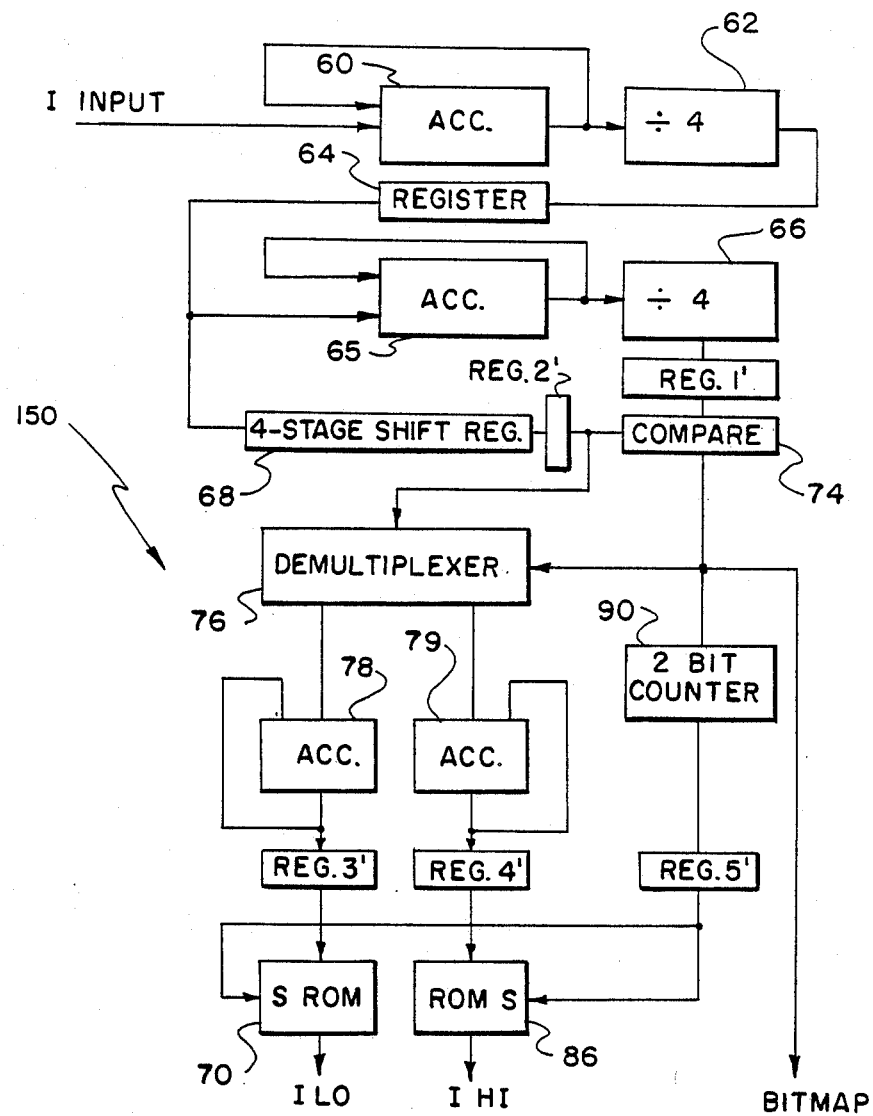
FIG. 8 is a block diagram of the I-channel architecture shown in the system embodiment of FIG. 4.

Referring now to FIG. 8 wherein the pipelined architecture 150 for the I channel is illustrated, the I input signal is directed to a 10 bit wide accumulator 60 which accumulates the received bits corresponding to the I input for 4 clock cycles before being reset. The accumulator 60 directs the accumulated sum to a divide by 4 circuit 62. The output of the divider circuit 62, which is the averaged I signal, is directed to a register 64. Register 64 holds the averaged I signal for 1 clock period and directs its output to an accumulator 65 and to a 4-stage shift register 68. From this point on the structure is a repeat of that disclosed in FIG. 7 for the Y channel signal processing.

The accumulator 65 provides its output to a divide by 4 circuit 66. The output signal from the divided by 4 circuit 66 is the $I_{avg.}$ threshold signal which is directed to the register REG.1'. The $I_{avg.}$ signal is maintained in REG.1' for 5 clock cycles. This threshold signal is compared against the signals appearing at the output of the register REG.2' which register stores the output of the 4-stage shift register 68. The comparing circuit 74 does the comparison and provides a "1" bit output when the signal at the output of REG.2' is above or equal to the threshold value of the signal in register REG.1'. In a converse manner, when the signal at the output of REG.2' is below the threshold value the comparing circuit 74 provides a "0" bit output. The "0" and "1" bit output signals of the comparing circuit 74 comprise the bitmap signal which is also the selection signal for selecting the output of the demultiplexer 76. The demultiplexer 76 determines from the level of the bitmap signal, applied to its S input, the path to be followed by the signal from the output of REG.2'. If the selection signal is a "0" the signal from the REG.2' is accumulated in an accumulator 78 and the sum is directed to the register REG.3'. The signal from REG.3' is divided and quantized in the ROM circuit 70 to provide the output signal $I_{Lo}$. If the selection signal from the comparing circuit 74 is a "1" then the signal present at the output of REG.2' is directed to the accumulator 79 for summation over a period of 4 clock bits and is stored in a register REG.4'. The signal stored in REG.4' is divided and quantized by the ROM 86 under control of the signal from the 2 bit counter 90 via the register REG.5'. The output signal from the ROM 86 is the $I_{Hi}$ signal.

The architecture thus far described provides high and low Y and I signals along with a bitmap for each associated group of signal.

Figure 9:
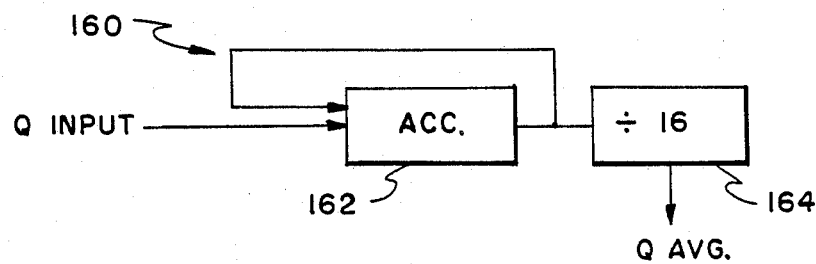
FIG. 9 is a block diagram of the Q-channel architecture shown in the system embodiment of FIG. 4.

Referring now to FIG. 9 wherein the architecture 160 for the Q channel is illustrated. The Q input signal is directed to an input to a 12 bit accumulator 162. The output from the 12 bit accumulator is loaded into a divide by 16 circuit 164. The output signal, $Q_{avg.}$, from the divide by 16 circuit 64 is an average of the summed signals received from the accumulator 162 over a period of 16 clock bits.

Figure 10:
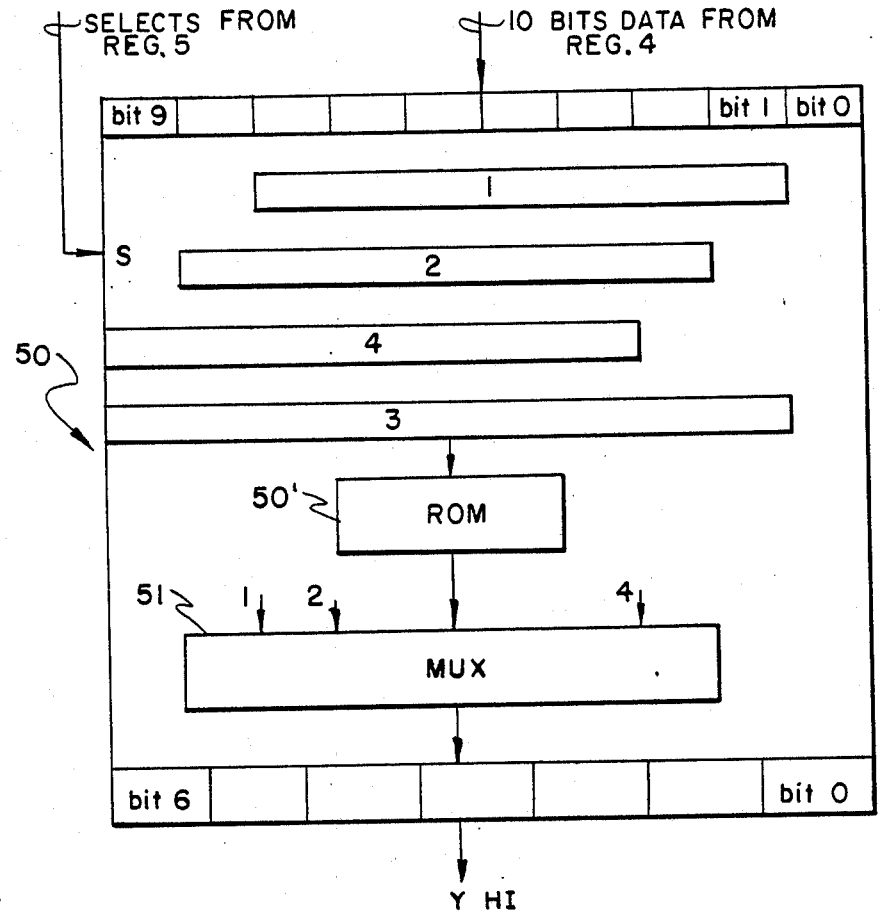
FIG. 10 is a block diagram of the division and quantization architecture which may be used for the ROM's in FIGS. 7 and 8.

Referring now to FIG. 10 wherein the architecture which may be used for ROM 48, 50, 70 and 86 is shown, the 10 bits of data received from REG.4 are shown in bit position notation. The select signal S from REG.5 is a 2 bit signal which represents the selection of a division by either 1, 2, 3 or 4. Since a division by 4, 2 or 1, can be performed by a bit shift, the only division which needs a look-up table is a division by 3. For example, upon receipt of the selection signal S equal to "00" the required division and quantization operation is performed by using only bits 1 through 7 from the received 10 bits to provide the required output value. This value is then passed through a 4:1 multiplexer 51 to provide the 7 bit divided and quantized signal $Y_{Hi}$. In a like manner the bits corresponding to a division by 2 and 4 can be achieved by taking the input bits shifted as shown for the blocks labeled 2 and 4 and providing the bits, through the multiplexer 51, as the output signal $Y_{Hi}$. As previously stated, the only division that cannot be processed in this manner is a division by 3. When this value is selected, the division is accomplished by addressing a look-up table in a ROM 50' and providing the 7 bit value found therein to the multiplexer 51.

It is believed that this particular hardware configuration for performing division and quantization utilizes a minimum amount of ROM.

Figure 11:
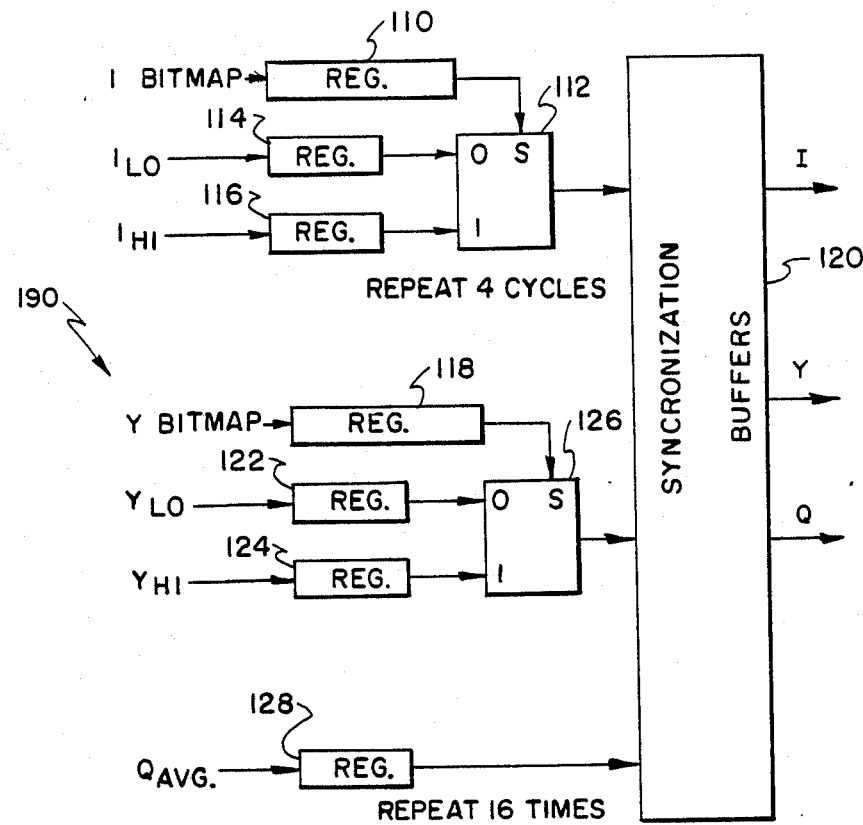
FIG. 11 is a block diagram of a decompression architecture which finds particular utility in the apparatus of FIG. 4.

Referring now to FIG. 11 wherein is shown a block schematic diagram of the decompression system 190 for decompressing the signals received from the decoder 180, the received I bitmap signal is directed to a shift register 110. The output signal from the shift register 110 is directed to the selection input S of a 2:1 multiplexer 112. The multiplexer 112 receives on its 0 labeled input the signal $I_{Lo}$ via a buffering register 114. On the 1 labeled input of multiplexer 112 the signal $I_{Hi}$ is received via a buffering register 116. In the operation of the preferred embodiment the cycling of the multiplexer 112 repeats every 4 cycles so as to reconstruct the I signal as a function of the I bitmap. The output from the multiplexer 112 is directed to a synchronization circuit 120 which functions as a buffer. The data for the reconstructed image is generated in the block sequence and is stored in the synchronization buffer 120. The data is read out from the synchronization buffers 120 in the scanning sequence.

The Y bitmap signal is directed to a shift register 118, the output of which is directed to the selection input S input of a 2:1 multiplexer 126. The multiplexer 126 samples the $Y_{Hi}$ and $Y_{Lo}$ signals via registers 124 and 122, respectively. The output from the multiplexer 126 is directed to an input of the synchronization buffers 120. The whole process is repeated four times for four Y subblocks.

The $Q_{avg}$ signal is buffered by a register 128 and is directed to an input of the synchronization buffers 120 for a total of 16 clock cycles.

From the foregoing it can be seen that the architecture of FIG. 11 reconstructs the original image by reversing the compression function described in conjunction with the architectures of FIGS. 7, 8 and 9.

While there has been shown what is considered to be the preferred embodiment of the invention it will be manifest that many changes and modifications may be made therein without departing from the spirit of the invention. It is therefore intended that the scope of the invention be limited only by the scope of the appended claims.

I claim:

1. A method for processing Y, I and Q color plane image signals representing pixel values, comprising the steps of:
    (a) grouping the Y color image plane elements into groups of four 2×2 blocks with each element formed from the average value of 4 neighboring pixels values;
    (b) grouping I color image plane elements into one 2×2 block with each element formed from the average value of 4 neighboring pixels values;
    (c) computing an average threshold value for each Y and I block of picture elements;
    (d) generating a bitmap of one value for each associated picture element equal to or above the average threshold value and of another value for each picture element having a value below the average threshold value;
    (e) generating a Hi average signal for the picture elements associated with said one bitmap value;
    (f) generating a Lo average signal for the picture elements associated with said another bitmap value;
    (g) average all of the elements of one 4×4 group of Q color image plane elements to provide a $Q_{avg}$ signal;
    (h) quantizing said Hi, Lo and $Q_{avg}$ signals; and
    (i) encoding said quantized signals and said generated bitmaps for compressed signal processing.

2. The method of claim 1 and further comprising the steps of:
    I. transmitting said encoded, quantized signals, and said generated bitmaps to a decoder;
    II. decoding said encoded, quantized signals, and said generated bitmaps; and
    III. decompressing said decoded quantized signals, and said generated bitmaps to form reconstructed Y, I and Q image plane signals.

3. The method according to claim 1 wherein the signal processing for the Y, I and Q plane image signals is performed in parallel.

4. A system for compressing and decompressing digitized color image signals comprising:
    input buffer means for receiving and storing digitized Y, I and Q image plane signals in a block format;
    an image compressor means having three parallel internal signal channels coupled to said input buffer means for receiving the block stored Y, I, and Q signals one per internal signal channel, and for compressing said Y, I and Q signals by block truncating in parallel;
    an encoder means coupled to said image compressor for encoding said compressed Y, I and Q signals for transmission;
    a decoder means for decoding said encoded compressed Y, I and Q signals;
    a transmission channel coupling said encoder to said decoder; and
    decompression means coupled to said decoder for decompressing the compressed digitized Y, I and Q color image signals.

5. The system according to claim 4 wherein said input buffer means is comprised of:
    a pair of memory banks for each of said Y, I and Q signals;
    an input switching means for toggling between said pair of memory banks to fill one bank and then the other;
    an output switching means for toggling between said pair of memory banks to empty filled memory banks; and
    an address generator means coupled to said memory banks for addressing the locations in said memory banks for storing said Y, I and Q signals in block format.

6. The system according to claim 5 wherein said address generator means is comprised of:
    a counter having an input for receiving a system clock signal and having multiple outputs corresponding in number to the number of binary bits forming the Y, I or Q signal on which outputs the bits corresponding to the count in the counter appear; and
    memory addressing means responsive to the bit count on the multiple outputs of said counter for addressing said pair of memory banks so as to fill said memory banks in a block format.

7. The system according to claim 6 wherein said counter is a 12-bit counter having outputs $A_0$–$A_{11}$; and wherein said memory addressing means has address inputs $A_0$–$A_{11}$ and wherein the outputs of said counter are connected to the address inputs of said memory addressing means as follows:

| counter means | memory addressing means |
| --- | --- |
| $A_0$ | $A_0$ |
| $A_1$ | $A_2$ |
| $A_2$ | $A_4$ |
| $A_3$ | $A_5$ |
| $A_4$ | $A_6$ |
| $A_5$ | $A_7$ |
| $A_6$ | $A_8$ |
| $A_7$ | $A_9$ |
| $A_8$ | $A_{10}$ |
| $A_9$ | $A_{11}$ |
| $A_{10}$ | $A_1$ |
| $A_{11}$ | $A_3$ |

8. The system according to claim 4 wherein said image compressor means is comprised of:
    a first internal signal channel for said Y signal comprising:
    first averaging means receiving said Y signal for providing an average valve of a block of Y signal values;
    first comparing means for comparing each Y signal value in a block against the provided average value so as to generate a two-level bitmap signal;

second averaging means for averaging all Y signals having a value corresponding to one level of said two-level bitmap;
third averaging means for averaging all Y signals having a value corresponding to the second level of said two-level bitmap; and
means for quantizing the averaged signals from said second and said third averaging means;
a second internal signal channel for said I signal comprising:
fourth averaging means for providing an average signal representing a block of I signal values;
fifth averaging means for providing an average signal representing blocks of averaged signals from said fourth averaging means;
second comparing for comparing each averaging signal from said fourth averaging means against the average signal from said fifth averaging means so as to generate a two-level bitmap;
sixth averaging means for averaging all average signals from said fourth averaging means having a value corresponding to one level of said two-level bitmap;
seventh averaging means for averaging all average signals from said fourth averaging means having a value corresponding to the second level of said two-level bitmap; and
means for quantizing the averaged signals from said sixth and said seventh averaging means;
a third internal signal channel for said Q signal comprising:
eighth averaging means for averaging a block of Q signal values.

9. The system according to claim 8 wherein said image compressor means is further comprised of:
a first demultiplexer means having an input coupled to receive said Y signal values, said demultiplexer responsive to the two-level bitmap signal from said first comparing means for directing said Y signal values to said second averaging means or said third averaging means as a function of the level of the two-level bit map signal; and
a second demultiplexer means having an input coupled to receive the provided averaging signal from said fourth averaging means, said demultiplexer responsive to the two-level bitmap signal from said second comparing means for directing the provided averaging signal from said fourth averaging means to said sixth averaging means or said seventh averaging means as a function of the level of the two-level bit map signal.

10. The system according to claim 9 wherein said eight averaging means is comprised of:
an accumulator for accumulating the values of all the Q signal values corresponding to a block; and
means for dividing the accumulated values by the number of values in a block.

* * * * *